Patented June 1, 1943

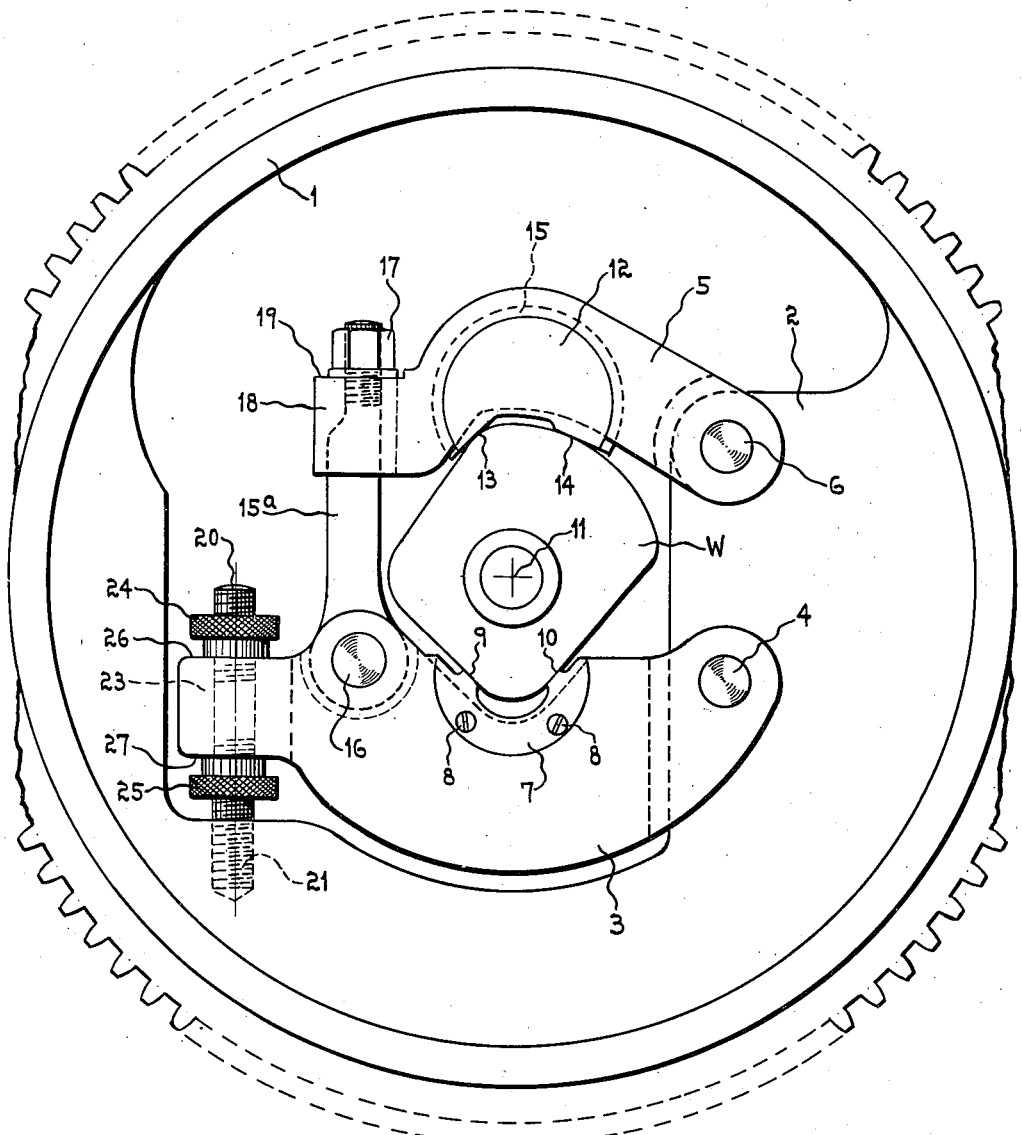

2,320,983

UNITED STATES PATENT OFFICE 2,320,983

CRANKSHAFT CHUCK

William F. Groene and Walter R. Meyer, Cincinnati, Ohio, assignors, by mesne assignments, to The R. K. Le Blond Machine Tool Company, Cincinnati, Ohio, a corporation of Delaware Application October 23, 1939, Serial No. 300,810

5 Claims. (Cl. 82—40)

This invention pertains to chucking devices for machine tools and more particularly is related to chucking devices for gripping rough irregular prelocated work pieces in lathes such as crankshaft lathes.

The object of this invention is to provide a chucking device for gripping a rough irregular prelocated work piece in the lathe incorporating a floating work engaging member which may be securely clamped to the rough work piece and then to provide means in conjunction with this work engaging mechanism for positively locking it against further floating movement relative to the chuck body upon which it is carried so as to provide a positive and rigid supporting and driving arrangement for the work piece to be turned.

Another object is to provide in a chucking device, adapted to support and rotate a rough irregular prelocated work piece, means for engaging the rough work piece without distorting it from its true located position and to provide a locking mechanism in conjunction with this work engaging mechanism which positively prevents further floating movement of said mechanism relative to the chuck of the lathe, said locking mechanism being effective in a plane perpendicular to the axis of rotation of the chucking device of the lathe.

Further features and advantages of this invention will appear from the brief description of the drawing in which is shown an axial view of a center drive ring gear chucking mechanism incorporating the features of this invention.

For illustrative purposes, this invention is shown applied to a ring gear 1 of a center drive lathe having an integral web portion 2 which carries the floating work engaging mechanism comprising the clamp arm 3 pivotally mounted on a pin 4 in the web 2 and a second clamp arm 5 pivotally mounted on a pin 6 in this web portion. In the clamp arm 3 is fixed a work engaging abutment block 7 by suitable screws 8 having abutments 9 and 10 arranged to engage a work piece W prelocated on the axis 11 of the chuck. In this instance a web W of a crankshaft is shown centered in a center drive lathe on the axis of rotation 11, the crankshaft rotating about this axis 11 to automatically bring the web W into simultaneous and equal contact with both abutment surfaces 9 and 10 of the abutment block 7 when the clamp arm 3 is swung upwardly.

In the clamp arm 5 is floatingly mounted the moon-shaped abutment jaw 12 having work engaging abutments 13 and 14 which automatically equalize themselves to engage the work with equal force due to the semi-circular mounting bearing 15 of this jaw 12 in the arm 5. Both of these clamp arms 3 and 5 are drawn together to simultaneously floatingly engage the work piece W by means of the eye bolt 15a pivotally mounted on a pin 16 in the clamp arm 3 and having the usual nut and washer 17 threaded on its outer end which enters bifurcated end portion 18 of the clamp arm 5 and engages the surface 19 of this clamp arm to tightly draw both clamp arms together by rotation of the nut 17.

When the nut 17 is so tightened, both of these jaws 3 and 5 come into engagement with the work W and their position is determined by the prelocated position of the work W. Tightening of this nut 17, therefore, securely binds these clamp arms 3 and 5 to the work without distorting it from its true prelocated position on the axis 11 of the lathe.

In order to positively hold these clamp arms, after they are clamped up against the work, in rigid fixed position on the ring gear so that when heavy machining operations are undertaken on the work piece or crankshaft W it will not be displaced from its true axial position 11, a unique positive locking device is provided to prevent these clamps having any relative movement with respect to the ring gear 1. This mechanism comprises a stud 20 which is threaded in fixed position at 21 in the web portion 2 of the ring gear 1. This locking stud 20 projects upwardly as shown in the drawing and has its axis lying in a plane substantially perpendicular to the axis 11 of rotation of chucking device of center drive ring gear 1 and passes up between the sides of the bifurcated end portion 23 of the clamp arm 3 and has knurled spin nuts 24 and 25 threaded thereon which may be lightly tightened down against the respective surfaces 26 and 27 of the clamp arm 3 after the clamp arms 3 and 5 have been securely bound up on the work W as described. Because of the particular arrangement of this positive locking device excessively heavy tightening of the spin nuts 24 is entirely eliminated with the important result that the work W is not disturbed from its true position 11 as is invariably the case in former devices of this kind in which the locking device must be applied with great pressure because of their frictional characteristics.

It can thus be seen that in this chucking device means are provided for floatingly mounting a work engaging clamping mechanism on the chuck body which may be rigidly bound to the work and which work engaging mechanism may be subsequently locked positively with relative light pressure against further floating movement by spinning the knurled spin nuts 24 and 25 on the stud 20 down against the respective surfaces 26 and 27 to thereby provide a positive means for locking out the floating movement of the work engaging portion of the chuck after it has been properly tightened on the work piece while accurately and rigidly maintaining the work in its true centered position 11.

Having thus fully set forth and described our invention what we claim as new and desire to secure by United States Letters Patent is:

1. In a chucking device for machine tools, a rotary work spindle, a floating work gripping member mounted on said work spindle for movement in a plane perpendicular to the axis of rotation of said work spindle, and positive locking means effective in a plane perpendicular to said axis of rotation to fix said work gripping member positively to said work spindle.

2. In a chucking device for machine tools, a rotary work spindle, a pair of clamping arms pivotally mounted on said spindle for movement in a plane perpendicular to the axis of rotation of the chuck, work engaging means in said arms, means for moving said arms to engage said work engaging means on a work piece in said chucking device, and means on said work spindle operating in a plane perpendicular to said axis of rotation engaging one of said arms to positively limit movement of said arms in said plane relative to said work spindle.

3. In a chucking device for machine tools, a rotary work spindle, a pair of clamping arms pivotally mounted on said work spindle each side of a work piece in said lathe, work engaging members in said arms, means on said arms for moving them together to effect engagement of said members with said work piece, a stud fixed in said work spindle with its axis lying in a plane perpendicular to the axis of rotation of said work spindle, a pair of knurled spin nuts on said stud, and a projection on one of said clamping arms extending between said spin nuts, and abutment surfaces on said projection adapted to be engaged by said nuts when said clamping arms have engaged their abutments with the work piece.

4. In a chucking device for machine tools, a rotary work spindle, a pair of clamping arms pivotally mounted on said work spindle each side of a work piece in said lathe, a fixed work engaging member in one of said arms, an equalizing work engaging member in the other of said arms, means on said arms for moving them together to effect engagement of said members with said work piece, a stud fixed in said work spindle with its axis lying in a plane perpendicular to the axis of rotation of said work spindle, a pair of knurled spin nuts on said stud, and a projection on one of said clamping arms extending between said spin nuts, and abutment surfaces on said projection adapted to be engaged by said nuts when said clamping arms have engaged their abutments with the work piece.

5. In a chucking device for machine tools, a rotary work spindle, a floating work gripping member mounted on said work spindle for movement in a plane perpendicular to the axis of rotation of said work spindle, positive locking means operating in a direction parallel to said plane to fix said work gripping member positively to said work spindle, and means operative with relatively light pressure to render said locking means fully effective.

WILLIAM F. GROENE.
WALTER R. MEYER.